United States Patent
Akula et al.

(10) Patent No.: US 12,493,578 B2
(45) Date of Patent: Dec. 9, 2025

(54) HANDLING COMPRESSED CRITICAL FILES

(71) Applicant: Kyndryl, Inc., New York, NY (US)

(72) Inventors: Ravinder Akula, Bengaluru (IN); Jeevabharathy Murugesan, Bangalore (IN); Karthikrajkumar Dhandapani, Bangalore (IN); Clea Zolotow, Dublin (IE)

(73) Assignee: Kyndryl, Inc., New York, NY (US)

( * ) Notice: Subject to any disclaimer, the term of this patent is extended or adjusted under 35 U.S.C. 154(b) by 0 days.

(21) Appl. No.: 18/110,063

(22) Filed: Feb. 15, 2023

(65) Prior Publication Data

US 2024/0273059 A1    Aug. 15, 2024

(51) Int. Cl.
*G06F 16/30* (2019.01)
*G06F 16/11* (2019.01)
*G06F 16/174* (2019.01)

(52) U.S. Cl.
CPC ........ *G06F 16/116* (2019.01); *G06F 16/1744* (2019.01)

(58) Field of Classification Search
CPC .............................. G06F 16/116; G06F 16/1744
See application file for complete search history.

(56) References Cited

U.S. PATENT DOCUMENTS

| | | | |
|---|---|---|---|
| 9,305,045 B1 * | 4/2016 | Cohen | H03M 7/30 |
| 9,355,112 B1 * | 5/2016 | Armangau | G06F 16/1744 |
| 10,359,960 B1 * | 7/2019 | Alshawabkeh | G06F 3/0689 |
| 10,587,883 B2 | 3/2020 | Wang | |
| 11,100,244 B2 | 8/2021 | Liu et al. | |
| 2005/0076031 A1 * | 4/2005 | Xu | G06F 16/10 |
| | | | 707/999.009 |
| 2007/0208893 A1 * | 9/2007 | Azzarello | G06F 16/1744 |
| | | | 710/68 |
| 2008/0307191 A1 | 12/2008 | Lane et al. | |
| 2011/0082842 A1 * | 4/2011 | Groseclose, Jr. | G06F 3/0638 |
| | | | 707/693 |
| 2016/0042006 A1 * | 2/2016 | Singh | G06F 16/1744 |
| | | | 707/693 |
| 2019/0020880 A1 | 1/2019 | Wang | |

(Continued)

FOREIGN PATENT DOCUMENTS

| | | |
|---|---|---|
| KR | 102173151 | 11/2020 |
| WO | 2004111881 | 12/2004 |
| WO | 2012056493 | 5/2012 |

OTHER PUBLICATIONS

Mell et al., "The NIST Definition of Cloud Computing", NIST, Special Publication 800-145, Sep. 2011, 7 pages.

(Continued)

*Primary Examiner* — Khanh B Pham
(74) *Attorney, Agent, or Firm* — Erik Swanson; Andrew M. Calderon; Calderon Safran & Wright P.C.

(57) ABSTRACT

A computer-implemented method includes: monitoring, by a computing device, a data set format of all files in a computing system to determine a list of data sets in a first format which are accessed greater than a predetermined number of times; gathering, by the computing device, the list of data sets in the first format within the computing system; and converting, by the computing device, the list of data sets in the first format within the computing system to a second format which is different from the first format.

23 Claims, 9 Drawing Sheets

(56) References Cited

U.S. PATENT DOCUMENTS

2020/0293677 A1  9/2020  Liu et al.
2022/0066647 A1* 3/2022  Krasner .............. H03M 7/6088

OTHER PUBLICATIONS

Unknown, "A method to rapid locate and retrieve resource from remote compressed package", IP.com No. IPCOM000231004D, published Sep. 22, 2013, 4 pages.

Unknown, "Control Blocks for Beginners Pt 2: z/OS Control Blocks", http://www.longpelaexpertise.com/ezine/CtBlksBeginners2.php, Long pela, Feb. 2009, 3 pages.

Unknown, Use the OBTAIN macro or a CVAF macro, https://www.ibm.com/docs/en/zos/2.3.0?topic-dscbs-how-found, downloaded Feb. 13, 2023, 12 pages.

Unknown, "Packed data Sets", https://www.ibm.com/docs/en/zos/2.3.0?topic=sets-packed-data, Mar. 3, 2021, 1 page.

Expert forum, "what is Pack On or Pack Off?", https://ibmmainframes.com/about25824.html, posted Nov. 8, 2007, 2 pages.

International Search Report issued on Nov. 11, 2023 in Application No. PCT/EP2023/063118; 13 pages.

* cited by examiner

HANDLING COMPRESSED CRITICAL FILES

BACKGROUND

The technical features of the present invention relate generally to a system and method for handling compressed critical files and, more particularly, to a system and method for handling compressed system and application critical files.

Data may be saved in either a packed (i.e., compressed) format or a standard format. Although packed data may occupy less space, there is an additional processing overhead that occurs every time the packed data is accessed/read or written to. This additional processing overhead for packed critical data sets may cause an outage, which will increase a million service units (MSU) utilization and increase application response time.

Interactive system productivity facility (ISPF), which is a host-based software development product including software configuration management, may use an internal algorithm for compressing (i.e., packing) data. When other processes, utilities, and/or software try to access the compressed data using the ISPF algorithm, the translation of the compressed data may produce a corrupted file with various unprintable characters scattered throughout, incorrect line breaks, and possibly extra data. Corrupted files and incorrect data may result in loss of business and/or fines. Also, there is no way of determining which data is compressed under the ISPF algorithm without accessing/reading the data.

When using ISPF browse, view, and edit functions, packed data sets may appear as readable text with no unprintable characters. However, the actual records in the packed data sets include various unprintable hexadecimal values which are substituted for a blank space. File transfer protocol (FTP) and other operating system processes and utilities do not recognize an ISPF packed on format, which may lead to an application or systems outage. For example, when a data set is transferred, the translation results in unusable characters, even if a transfer is done to another operating system. Additionally, if an original data set has a record format that is set to a fixed length block, an ISPF algorithm may leave extraneous data in a last record to fill out a record length. In this situation, a file may become corrupted after the data set is transferred.

In known systems, pack checking may be performed manually by unpacking compressed data (i.e., packed data) and then comparing the packed off data to a non-packed data (i.e., data that was not compressed to begin with). In known systems, a compare report may include entries which indicate which data has been packed. However, it is difficult to predict data sets that are packed, and this manual compare process is time intensive and creates additional processing burdens.

SUMMARY

In a first aspect of the invention, there is a computer-implemented method including: monitoring, by a computing device, a data set format of all files in a computing system to determine a list of data sets in a first format which are accessed greater than a predetermined number of times; gathering, by the computing device, the list of data sets in the first format within the computing system; and converting, by the computing device, the list of data sets in the first format within the computing system to a second format which is different from the first format.

In another aspect of the invention, there is a computer program product including one or more computer readable storage media having program instructions collectively stored on the one or more computer readable storage media. The program instructions are executable to: detect a list of data sets in a first format using neighborhood topology and application grouping in a computing system; convert the list of data sets in the first format within the computing system to a second format which is different from the first format; and permanently disable the list of data sets from being converted to the first format within the computing system.

In another aspect of the invention, there is system including a processor, a computer readable memory, one or more computer readable storage media, and program instructions collectively stored on the one or more computer readable storage media. The program instructions are executable to: receive data of a list of data sets from a knowledge base library in a computing system; detect the list of data sets in a first format using neighborhood topology and application grouping in the computing system; and automatically convert the list of data sets in the first format within the computing system to a second format which is different from the first format based on the received data of the list of data sets from the knowledge base library.

In another aspect of the invention, there is a computer-implemented method including: scanning for compressed data sets that need to be converted to corresponding uncompressed data sets within a mainframe; proactively discovering other compressed data sets that need to be converted to corresponding uncompressed data sets within the mainframe using particle swarm optimization (PSO); and converting the compressed data from scanning and the other compressed data from the proactive discovery to corresponding uncompressed data sets.

In another aspect of the invention, there is a computer program product including one or more computer readable storage media having program instructions collectively stored on the one or more computer readable storage media. The program instructions are executable to: proactively discovering compressed data sets that needs to be converted to corresponding uncompressed data within a mainframe using particle swarm optimization (PSO); automatically converting the compressed data sets to corresponding uncompressed data sets; and permanently disabling the uncompressed data sets from being converted to the compressed data sets.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
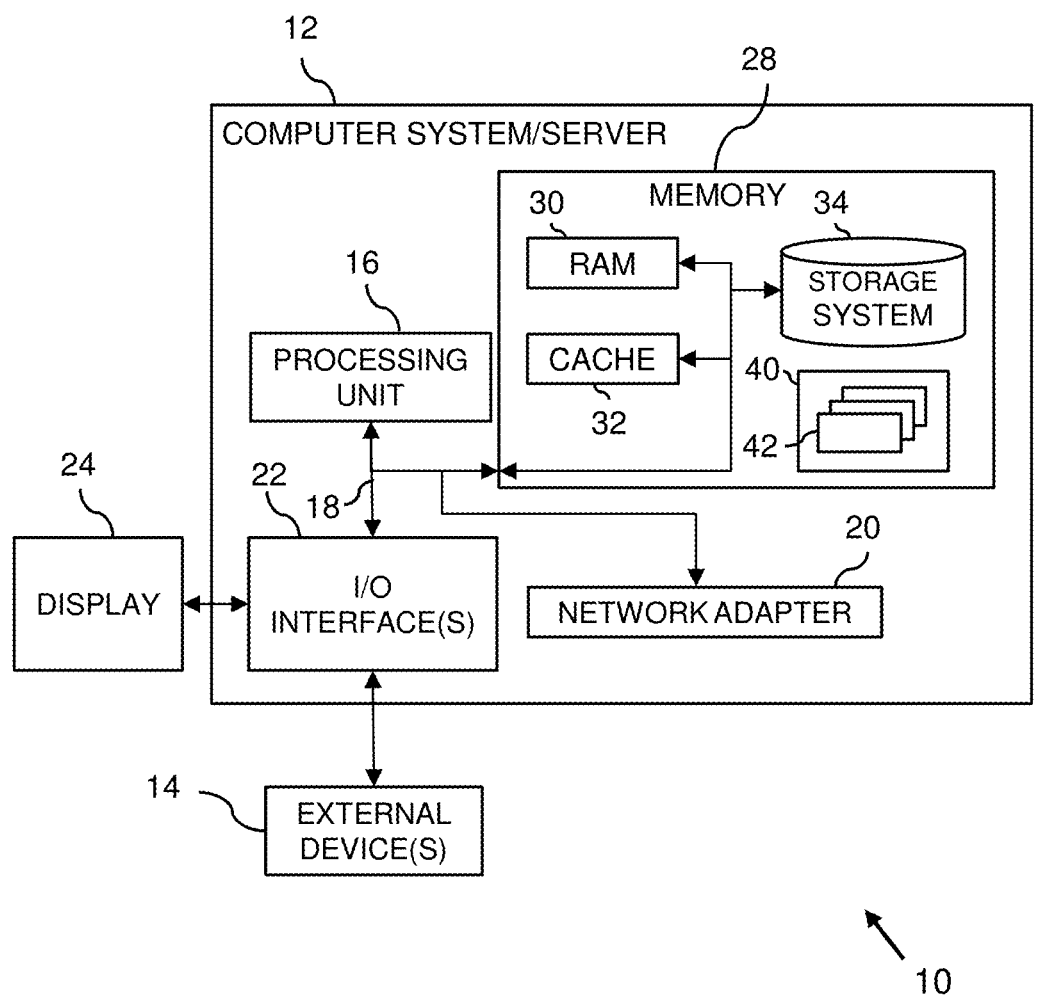
FIG. 1 depicts a cloud computing node according to an embodiment of the present invention.

The technical features of the present invention relate generally to a system and method for handling compressed critical files and, more particularly, to a system and method for handling compressed system and application critical files. More specifically, embodiments of the present invention provide a system and a method that implements technical features such as disabling a pack on format (i.e., compressed format) for system critical data sets to prevent system or sub system outages. Further, embodiments of the present invention provide a system and a method that implements technical features such as identifying highly used data sets and pack on formatted data sets, and converting the highly used and pack on formatted data sets to a packed off data set.

The advantage of the aforementioned technical solution for embodiments of the present invention is that finding and preventing a pack on format for critical system data sets will reduce MSU utilization and increase application response time. In contrast, in known systems, utilities and system programmers may pack (i.e., compress) a critical data set that will create an outage to the system. In known systems, packed data saves space at an expense of an additional processing burden when the packed data is read or written. Further, in known systems, the packed data cannot be directly accessed by programs and needs intermediary utilities and/or software programs to unpack the packed data for reading data, writing data, and/or execution of the data.

The technical features of the present invention include an ability to identify commonly used and critical data sets to ensure data reliability and accurate data. For example, many institutions may rely on a specific operating system connect program to transfer files for end of the day processing to a regulatory agency. In this example, transferred files must be accurate and received by a predetermined time to avoid fines. In known systems, a situation may arise in which the regulatory agency receives a corrupted file. Therefore, in known systems, a fine would be levied on the bank for the corrupted file. In contrast, the technical features of the present invention ensure that the files are transferred to the regulatory agency on time and in an accurate and reliable process to avoid the fines.

The technical features of the present invention prevent system outages because the system and method of the embodiments use an automated and accurate conversion of critical data sets from a pack on format to a pack off format. Further, the technical features of the present invention prevents application outages and enhances a performance throughput because the system and method of the embodiments will prevent application data and code from having a pack on format. The technical features of the present invention ensures that file data transfers happen in a predetermined time with accurate data because the system and method of the embodiments will avoid corruption of data that may occur when data is in a pack on format. The technical features of the present invention also include eliminating processing overhead for frequently used data sets, allowing for direct access of data by programs, and cost saving since no additional tools are required to read or write the data.

Moreover, implementations of the invention provide an improvement in the technical field of handling compressed data by including a unique discovery mechanism that builds awareness about data sets that are in a packed on format that need to be converted to an packed off format. Implementations of the invention may also provide additional improvements in the technical field of handling compressed data by including a gathering mechanism (i.e., collection mechanism) for gathering a list of relevant data sets for conversion. Implementations of the invention provide additional improvements in the technical field of handling compressed data by including a database engine which includes a knowledge base containing specific application data, system data, and/or migration data. In addition, implementations of the invention provide an improvement in the technical field of handling compressed data by including a processor that will use the data list acquired by the unique discovery mechanism and the gathering mechanism to search the knowledge base for additional data, match the additional data to the gathered data sets, and provide a conversion process. Implementations of the invention also provide an improvement in the technical field of handling compressed data by including an execution mechanism which auto adjusts a parameter of the gathered data sets and updates the packed on format to a packed off format of the gathered data sets. In embodiments of the present disclosure, each of the unique discovery mechanism, the gathering mechanism, the database engine, and the execution mechanism may comprise a processor, a hardware circuit, and/or firmware (e.g., software) for performing their respective functions.

Aspects of the present invention include a system, method and computer program product which may include scanning an environment (e.g., a mainframe environment) for compressed data sets (e.g., data sets in an ISPF pack on format). Aspects of the present invention may also include automatic detection and conversion of compressed data sets using a library (e.g., knowledge base). Aspects of the present invention may include marking system critical data sets or application critical data sets such that a pack option is permanently disabled. Aspects of the present invention may include utilizing control block information, system management facility (SMF) data, resource management facility (RMF) data with system level data to create a list of application and/or transfer data sets. Aspects of the present invention may include utilizing a negative test for application data sets or migration data sets to further identify a pack on exclusion within a particle swarm optimization (PSO).

Aspects of the present invention also include a system, method, and computer program product to use PSO to proactively discover data sets that need to be converted to a packed off format. For example, data sets that are load libraries, operating system connect data sets, file transfer protocol (FTP) data sets need to be converted to a packed off format to prevent data corruption and inaccurate data. Further, aspects of the present invention may include additional data sets that need to be converted to the packed off format using data from the knowledge base. In aspects of the present invention, PSO uses a neighborhood topology to discover critical (e.g., highly utilized) data sets that should not be in a pack on format and discover data sets that would be unreadable in a pack on format for conversion to a packed off format.

Aspects of the present invention may also include a method, system, and computer program product for disabling a pack on format for system and application critical data sets to prevent system outages and inaccurate data. In addition, implementations of the invention provide an improvement (i.e., technical solution) to a problem arising in the technical field of handling compressed data by discovering data sets that are in a packed on format that need to be converted to a packed off format.

According to an aspect of the invention, the system, method, and computer program product reduces outages and fines for not meeting system uptime requirements by converting compressed data sets (i.e., pack on data sets) to uncompressed data sets (i.e., pack off data sets). For example, the computer-implemented method includes: monitoring a data set format of all files in a computing system to determine a list of data sets which are accessed greater than a predetermined number of times; gather the list of data sets in a first format within the computing system; and convert the list of data sets in the first format within the computing system to a second format which is different from the first format. In another example, the computer-implemented method includes: scanning for compressed data sets that need to be converted to corresponding uncompressed data sets within a mainframe; proactive discovery for other compressed data sets that need to be converted to corresponding uncompressed data sets within the mainframe using PSO; and converting the compressed data from scanning and the other compressed data from the proactive discovery to corresponding uncompressed data sets.

It should be understood that, to the extent implementations of the invention collect, store, or employ personal information provided by, or obtained from, individuals (for example, compression information), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (Saas): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
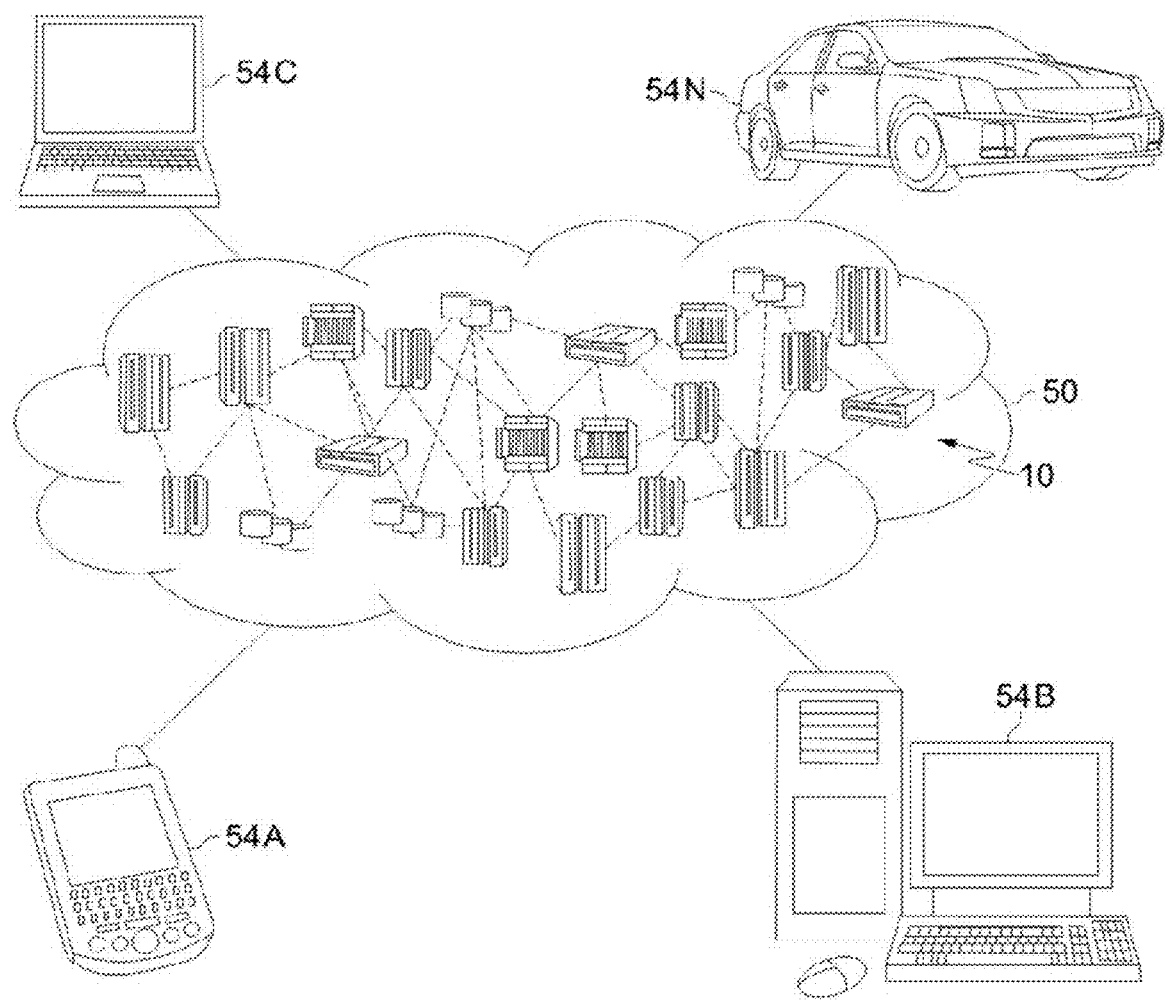
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
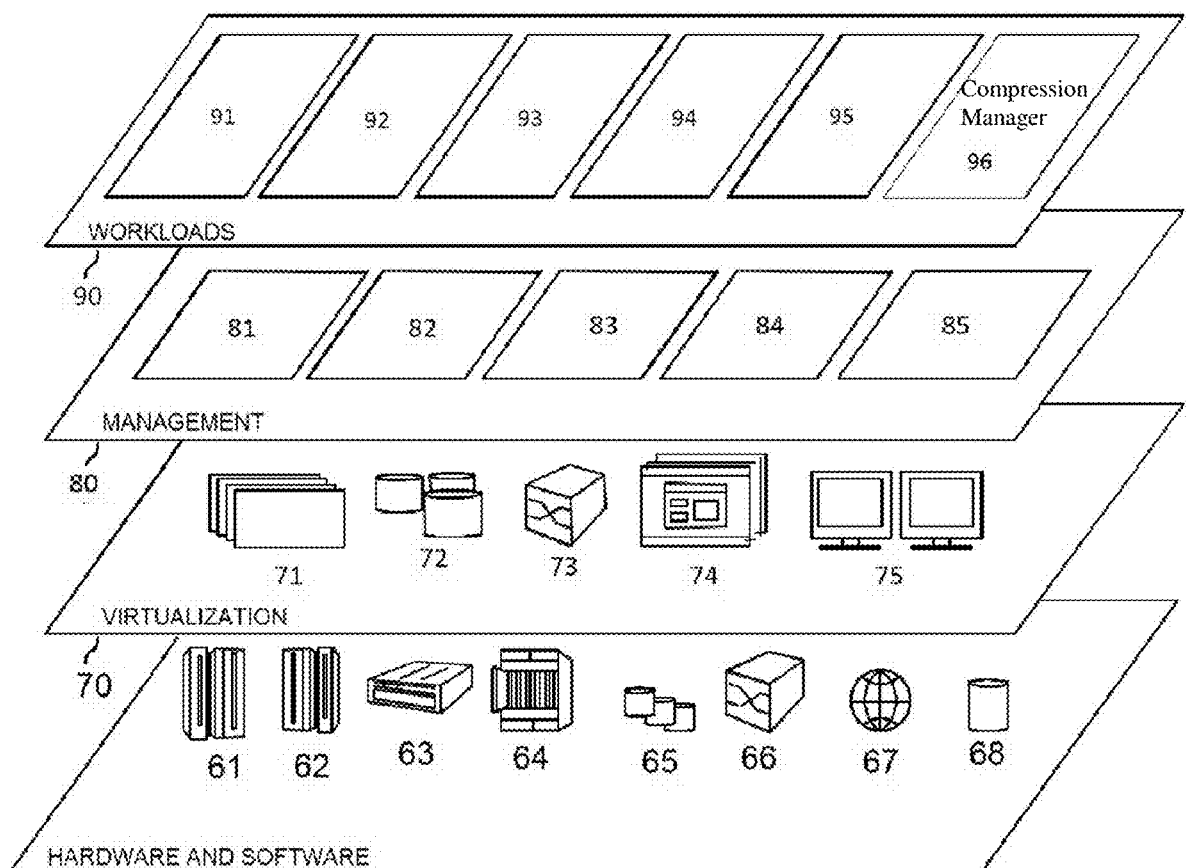
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and compression manager 96.

Implementations of the invention may include a computer system/server 12 of FIG. 1 in which one or more of the program modules 42 are configured to perform (or cause the computer system/server 12 to perform) one of more functions of the compression manager 96 of FIG. 3. For example, the one or more of the program modules 42 of the compression manager 96 may be configured to monitor a data set format of all files in a computing system to determine a list of data sets which are accessed greater than a predetermined number of times; gathering the list of data sets in a first format within the computing system; and converting the list of data sets in the first format within the computing system to a second format which is different from the first format.

Figure 4:
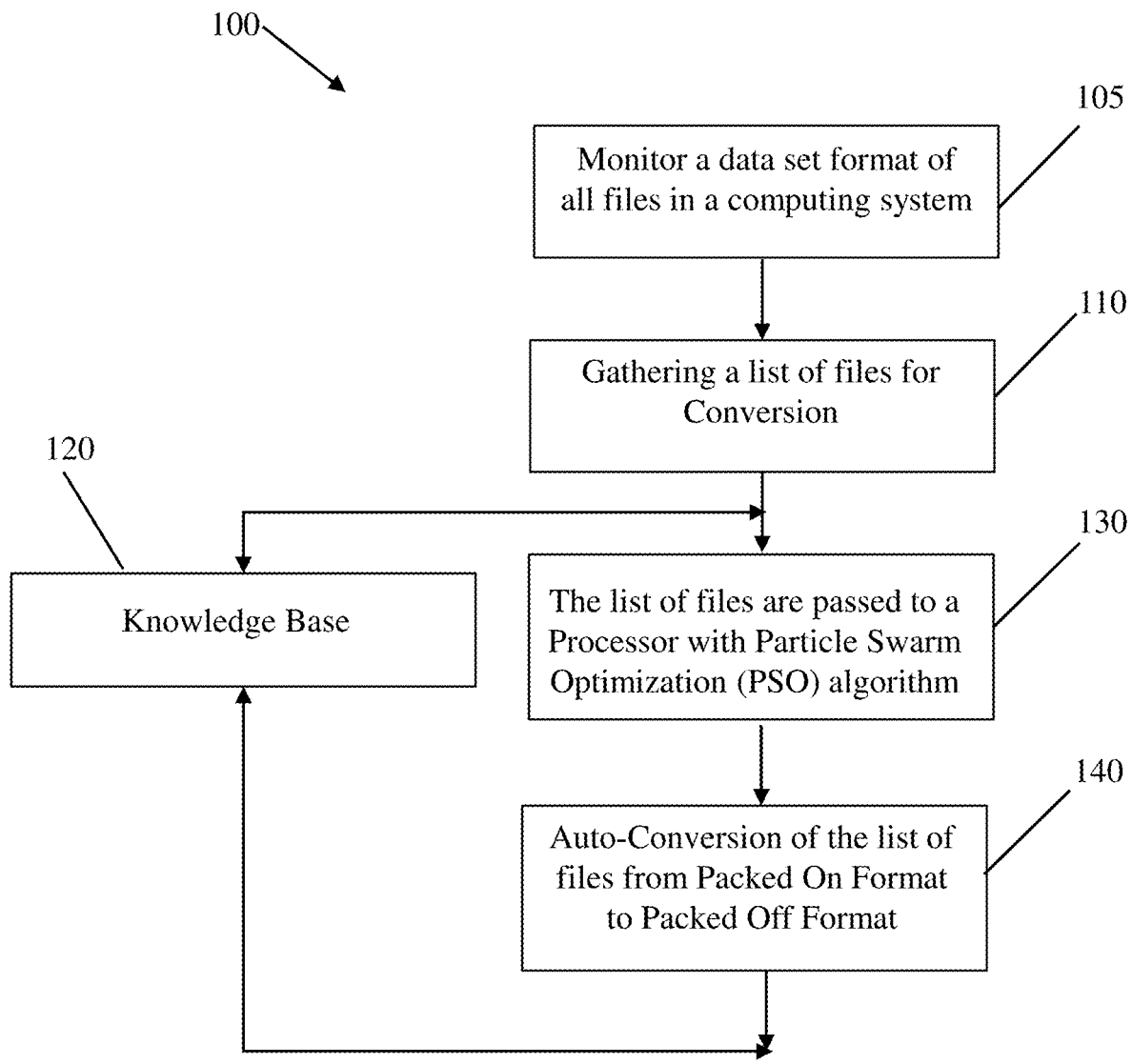
FIG. 4 shows a flowchart of handling compressed files in accordance with aspects of the invention.

FIG. 4 shows a flowchart 100 of handling compressed files in accordance with aspects of the invention. In embodiments of the flowchart 100 of FIG. 4, at step 105, a data set format may be monitored for all files in a computing system. As an example, the computing system may be monitored to determine a set of data sets with a pack on format, such as the ISPF pack on format. Further, the computing system may monitor all files to determine application critical data sets, system critical data sets, highly utilized data sets (e.g., accessed greater than a predetermined number of times), transfer file data sets, etc.

In embodiments of FIG. 4, in step 105, by utilizing a control block of system management facility (SMF) records and/or a virtual storage access method (VSAM) within a data facility storage management subsystem (DFSMS), a type of data set and a frequency of use of the data set may be determined. The SMF records and the VSAM records may be a component of an operating system which includes a record of file activity. In particular, DFSMS may be a storage management system. In situations where DFSMS is not installed or DFSMS records are not kept, a data set control block (DSCB) may be accessed which contains a last access date. The last access data may be read using a macro or assembly language using a volume table of contents (VTOC) scan. The last access date, SMF records, VSAM records may be used to determine a job name and a program name that accessed these records. By determining the last access data, the SMF records, the job name, and the program name, highly utilized data sets, application critical data sets, and system data sets may be determined for conversion to a pack off format.

In embodiments of FIG. 4, in step 110, a list of the highly utilized data sets, the application critical data sets, and the system data sets may be gathered (i.e., collected) together for conversion. In step 120, data of these data sets in step 110 (i.e., the highly utilized data sets, the application critical data sets, and the system data sets) may be sent to a database engine which includes a knowledge base (i.e., a library). In embodiments, the knowledge base may contain specific application/system/migration data which helps to prepare the data sets for conversion. In step 120, which is an optional step, the database engine (which includes the knowledge base) may send the data of the data sets to a processor in step 130 for conversion.

The database engine (which includes the knowledge base) may also receive the data of the data sets in step 110. Thus, the database engine (which includes the knowledge base) may receive current data of current data sets which may be used for future conversions of data sets and may also send previous data of previous data sets (i.e., from a previous conversion) which may be used for a current conversion of data sets. Accordingly, the knowledge base may be iteratively used to improve the detection and conversion of the data sets in the system. Thus, the database engine which includes the knowledge base may use machine learning to iteratively improve the detection and conversion of the data sets in the system. In embodiments of the present disclosure, the database engine may comprise a processor, a hardware circuit, and/or firmware for performing respective functions.

In in step 130, the list of files from step 105 (i.e., application critical data sets, system critical data sets, highly utilized data sets, transfer file data sets, etc.), the list of files from step 110 (i.e., the highly utilized data sets, the application critical data sets, and the system data sets), and data of the data sets from the database engine including the knowledge base in step 120 may be passed to a processor with a PSO algorithm. In an embodiment, the processor in step 130 may also search the database engine including the knowledge base in step 120 for additional data of the data sets for a conversion process. The PSO algorithm in step 130 proactively discovers data sets that need to be converted to a packed off format. The details of the PSO algorithm will be further described in FIGS. 6-8. In embodiments of the present disclosure, the processor may comprise a hardware circuit and/or firmware for performing respective functions.

In step 140, an auto-conversion is performed for the list of files from a packed on format to a packed off format. In particular, the list of files in step 130 may be converted from a packed on format to an packed off format and marked such that an option for the list of files being in the packed on format is permanently disabled. In further embodiments, the list of files in step 130 may be marked by auto adjusting a parameter such that the option for the list of files being in the packed on format is permanently disabled. After step 140, the data from the list of files in step 130 may also be sent to the database engine which includes the knowledge base for future conversions; although this step is optional.

Figure 5:
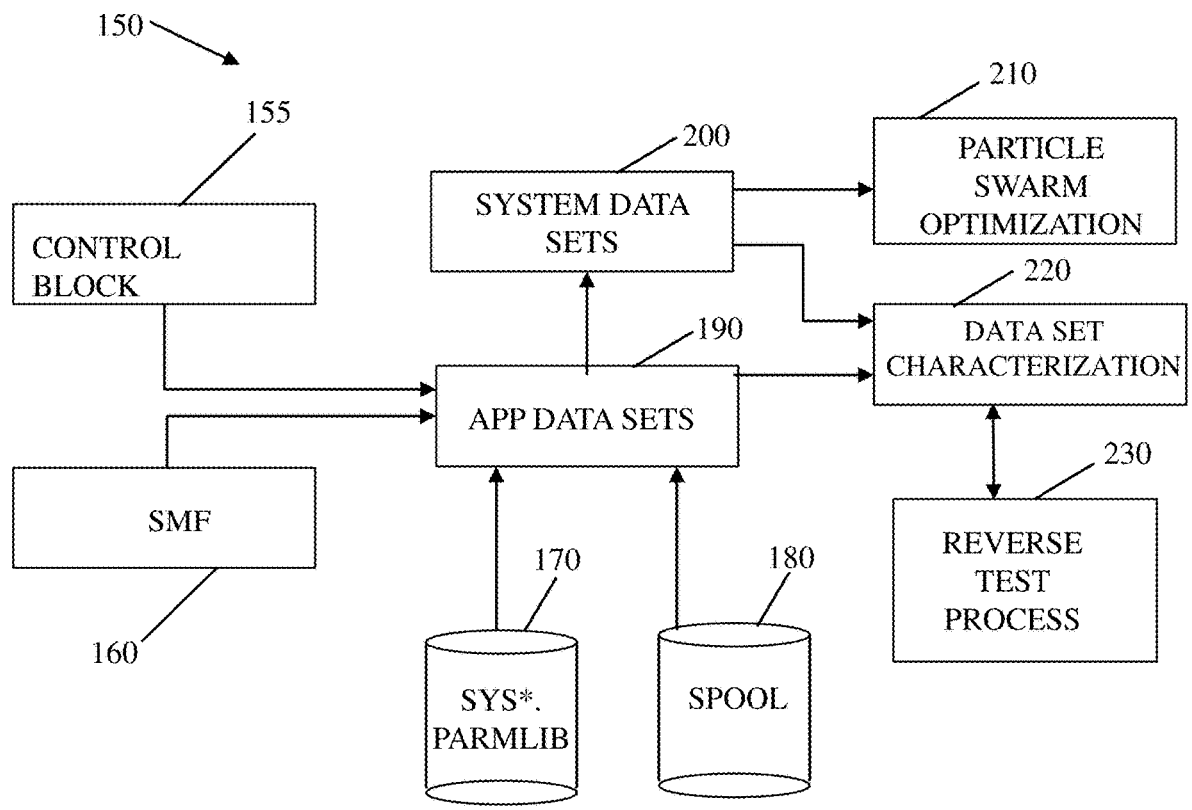
FIG. 5 shows a flowchart of particle swarm optimization in accordance with aspects of the invention.

FIG. 5 shows a flowchart 150 of a particle swarm optimization in accordance with aspects of the invention. FIG. 5 may also be representative of a block diagram of an architecture in accordance with aspects of the present invention. In embodiments, the PSO may be utilized to proactively discover data sets that need to be immune to packing, such as load libraries, operating system connect data sets, file transfer protocol (FTP) data sets, application critical data sets, system critical data sets, etc. Further, additional data sets may be provided by the data engine which includes a knowledge base (i.e., a library). In the flowchart 150, various records may be brought in to determine an access rate and utilization of data sets to identify system and application data sets that should not be in a pack on format. Also, the various records may identify data sets which are utilized by an operating system connect and a file transfer protocol (FTP).

In step 155, a control block contains a last access date which may be read either with a macro or an assembler language via a volume table of contents (VTOC) scan. The last access date may also be utilized with SMF records and/or VSAM records to determine a job name and a program name that accessed the records. In embodiments, a data set corresponding to the control block may be trained utilizing data for a predetermined time period (e.g., 15 minute data) and then a randomized job may be created to pull new data to keep the data up to date (i.e., every time the VTOC scan is run). In embodiments, in step 155, by utilizing the control block and the last access date, highly used data sets may be determined for critical application data sets and critical system data sets.

In step 160, a system management facility (SMF) record may contain DFSMS activity for opening a data set. If there is no DFSMS in the system, a VTOC scan and/or the assembler routine may be used for the control block. In particular, a subtype 27 of the SMF record may be created each time the VTOC is changed. The subtype 27 of the SMF record may be created when data set operations (i.e., create, extend, partial release, rename, scratch) are performed, defragmentation and consolidation operations, and a data set control block (DSCB) update. A subtype 6 of the SMF record may be generated when a close operation or an interval record operation is performed.

In step 170, a SYS*.PARMLIB comprises a required partitioned data set that includes control parameters for the system. In step 180, a spool syslog file comprises a direct access data set that stores messages and commands which is stored in a spool space. In embodiments, in step 190, a data variable merge operation may occur which merges either the control block in step 155 (e.g., the data set control block (DSCB)) or the SMF record in step 160 with application data sets derived from the SYS*.PARMLIB in step 170 and the spool syslog in step 180. The data variable merge operation in step 190 may determine an application usage of data sets by matching a program value from jobs with a SYSIN command of a data set. The SYSIN command may specify a file containing a predetermined program when running in batch or noninteractive mode. The data variable merge operation in step 190 may then merge the application usage of data sets with a control block of the subtype 27 of the SMF record to find a utilization pattern of the application data sets.

In step 200, the system data sets may receive the utilization pattern of the application data sets and determine a utilization pattern of the system data sets. The system data sets may be sent to a PSO in step 210. The details of the PSO in step 210 will be further described in FIGS. 6-8. In step 220, the data set characterization may receive the utilization pattern of the application data sets in step 190 and the utilization pattern of the system data sets in step 200 and may characterize all of the received data sets.

In step 230, a reverse test process may reverse test a list of the application data sets received from the data set characterization in step 220. In particular, the reverse test process may create a list of the application data sets received from the data set characterization in step 220 and then create a negative copy (i.e., data sets that look like they are supporting applications but do not show in data set name files or SYS1.*data set names). In embodiments, SYST1.*comprises a standard identifier for a system data set. The system may then perform a pack on operation on the data set to test if the data set is being accessed by an application while monitoring the data sets. In this scenario, an application will be unable to read the data set because the data set has a pack on format. The application may either stop working (i.e., go down) or may simply try to delay to get input/output data from the locked data set (i.e., a data set that is in the pack on format). In embodiments, the application may unpack the data set (i.e., convert the data set to a packed off format), restart the application if necessary, and continue processing. In embodiments, the processes in step 230 may be performed during off peak hours.

Figure 6:
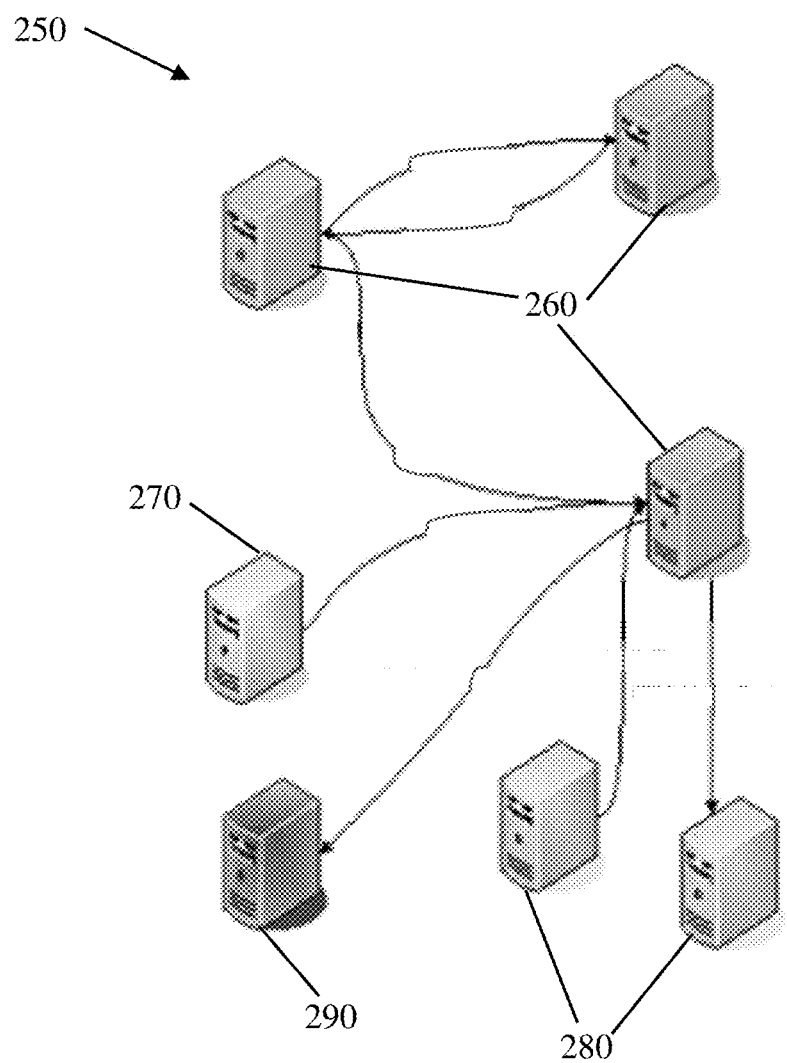
FIG. 6 shows a connectivity between sites in the particle swarm optimization in accordance with aspects of the invention.
Figure 6:
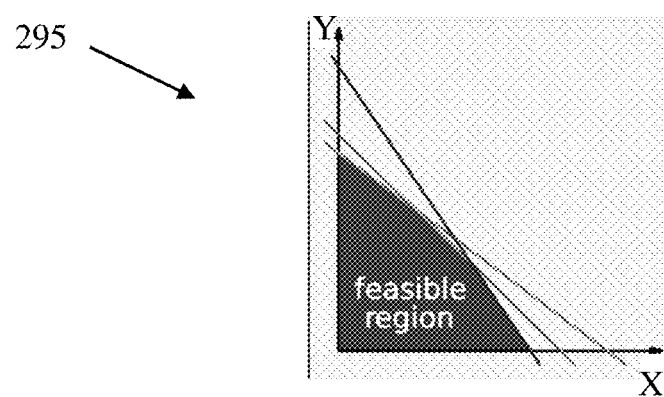

FIG. 6 shows a connectivity between sites in the particle swarm optimization in accordance with aspects of the invention. In embodiments, FIG. 6 shows a neighborhood topology 250 with multiple sites 260, 270, 280, and 290 and connectivity between each of these sites 260, 270, 280, and 290. In embodiments, the multiple sites include a first site 260, a second site 270, a third site 280, and a fourth site 290 are provided. PSO supports the neighborhood topology 250 by having a population of candidate solutions that are optimized within a search space. In embodiments, different applications may reside in different libraries (e.g., parmlibs) and may have different behaviors. Thus, the neighborhood topology 250 of FIG. 6 may correspond application groups with similar behaviors for a one-hot encode operation (i.e., pack on format or pack off format). In particular, the candidate solutions may be a set of application groups that are contained within the sites 260, 270, 280, and 290 found during a discovery phase.

In FIG. 6, the particle swarm optimization (PSO) may depend on the candidate solutions. For example, subsets of data sets within each application provides the candidate solutions (e.g., candidate lists). These candidate solutions may be plotted in a graph 295 by the application to observe a feasible region. In the graph 295, an X axis is an amount of opens (e.g., every minute or once per month) and a Y axis is a type of access (e.g., chatty, intermittent, etc.) In this situation, the candidate solutions only share information with a subset of data sets. The subset may be a geometric subset but expands given parameters in a search space from a knowledge base. Accordingly, the PSO utilizes metrics such as a number of accesses per hour (or accesses per minute) or transactional chattiness. Thus, in embodiments, particle swarm optimization looks to get a cone of an entire optimal group, instated of just looking at a single minima in known systems.

Figure 7:
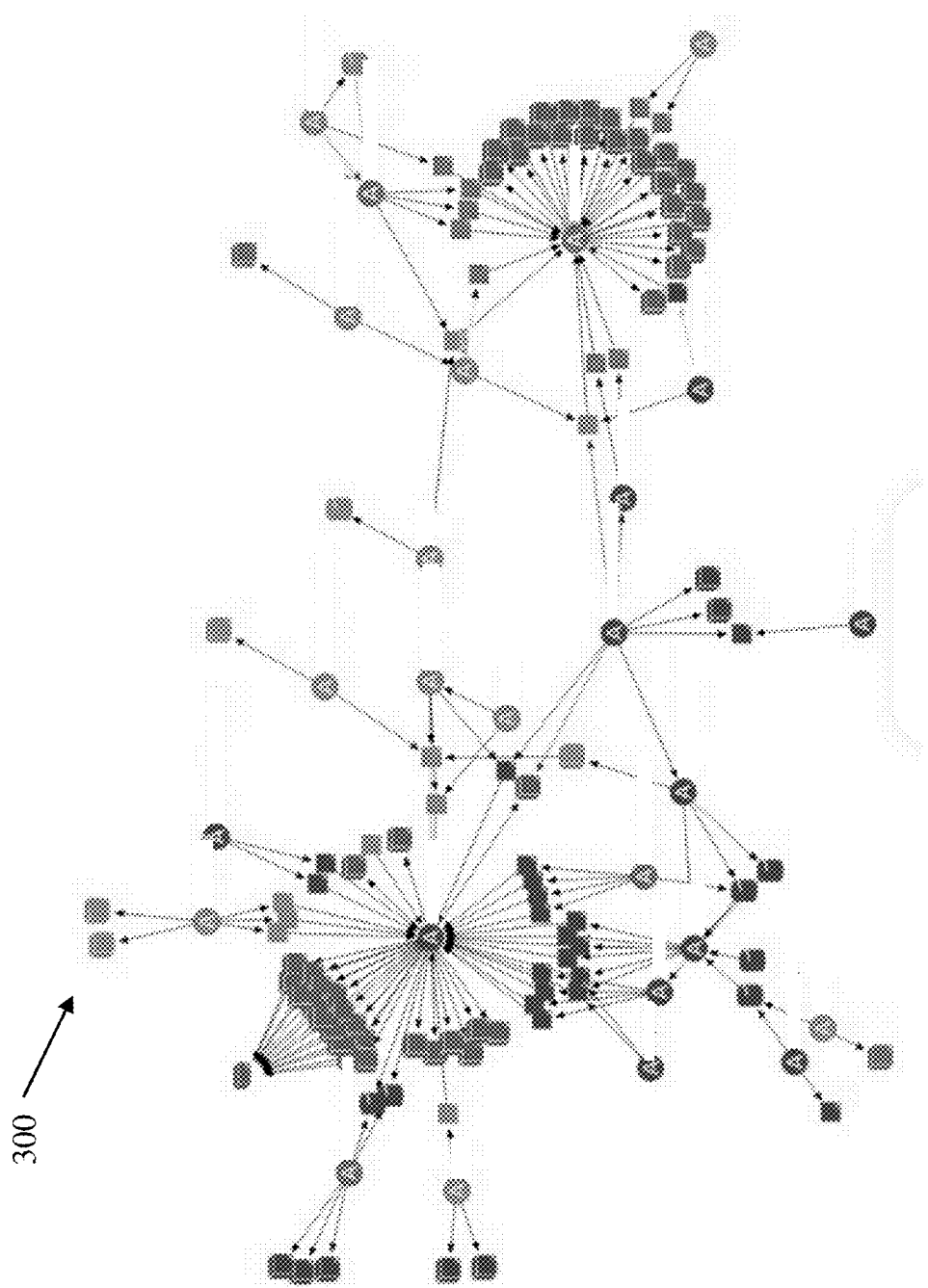
FIG. 7 shows application groups within a site in the particle swarm optimization in accordance with aspects of the invention.

FIG. 7 shows application groups within a site in the particle swarm optimization in accordance with aspects of the invention. Specifically, FIG. 7 shows application groups 300 within a site (e.g., one of the sites 260, 270, 280, and 290 in FIG. 6). In FIG. 7, the application groups 300 may have a connectivity that is tightly coupled (i.e., chatty) or loosely coupled (i.e., intermittent batch access).

In embodiments of FIG. 7, the PSO performs a type of applications discovery and classification of the applications. The type of applications discovery and classification can be used to discover and classify the unique signatures of each application. For example, if all the applications were classified without utilizing PSO, the loosely coupled applications (which may not be chatty, but are still mission critical) may be ignored because the online transaction workloads would be optimized for the tightly coupled applications. The PSO uses entire application groups (i.e., application groups 300) in an iterative process so that the loosely coupled applications (which may not be chatty, but are still mission critical) would still be processed and would not be left out of processing or stuck at the end of the processing queue.

Also, in embodiments of FIG. 7, the PSO optimizes a data set utilization to apply a pack on format and a pack off format. In particular, data sets that are highly utilized for applications would not have a pack on format enabled as a pack on format will have a high run time. Also, system data sets would not have a pack on format enabled as these data sets will make a data set unreadable (e.g., pack on format for sys1.parmlib will be unreadable).

Figure 8:
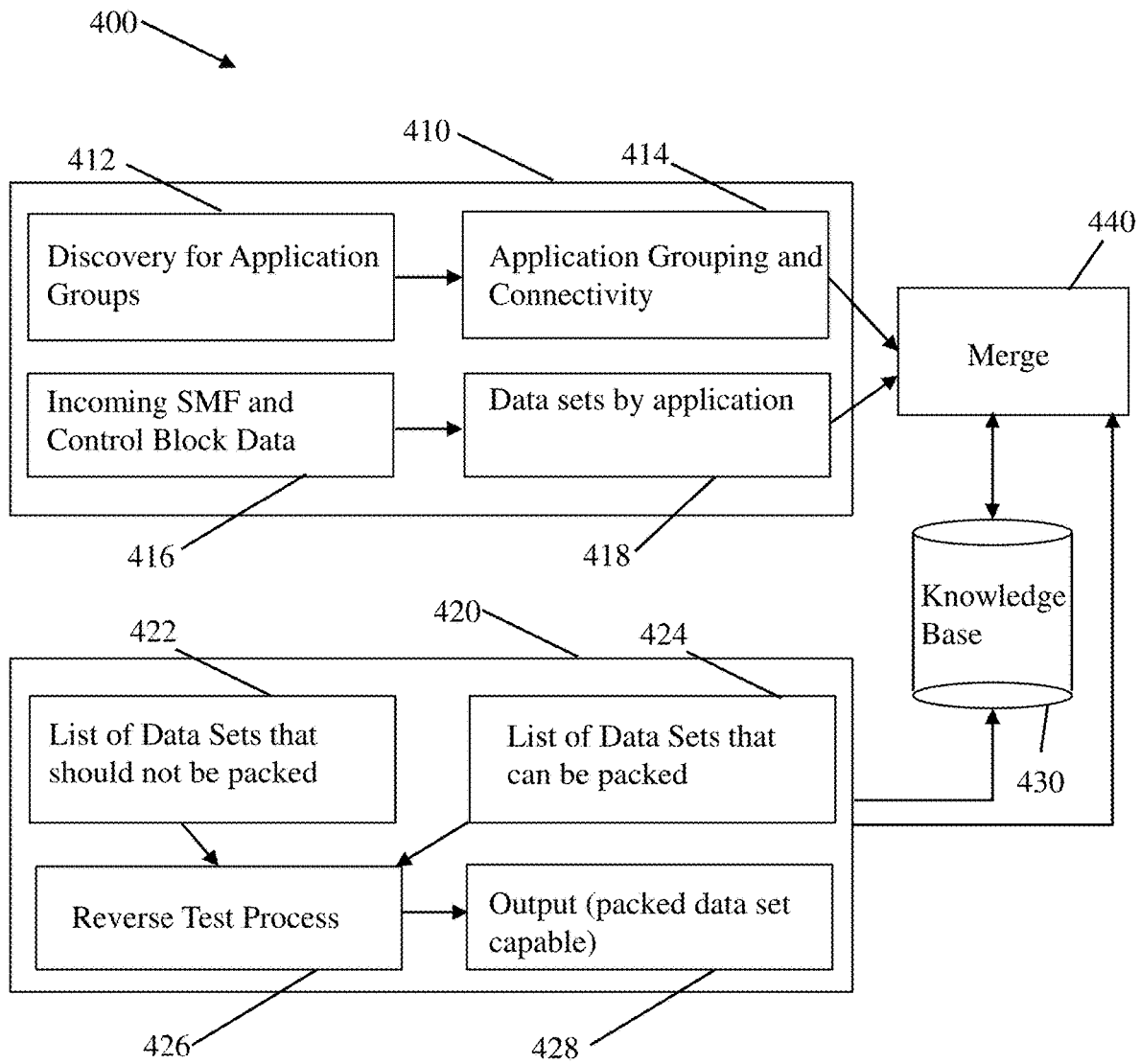
FIG. 8 shows a detailed flowchart of the particle swarm optimization in accordance with aspects of the invention.

FIG. 8 shows a detailed flowchart of the particle swarm optimization in accordance with aspects of the invention. In FIG. 8, the flowchart 400 comprises a data and application flow 410 and a data set processing and reverse test process flow 420. In the data and application flow 410, in step 412, application groups 300 may be discovered in the system. In step 414, application groups 300 within the neighborhood topology 250 (i.e., connectivity) of the system may group applications according to similar behaviors and characteristics. The application groups 300 in step 414 may then be passed to a merge operation in step 440. In the data and application flow 410, the SMF and control block data may be received at step 416. In step 418, the data sets may be generated and collated according to their application. The data sets may then be passed to the merge operation in step 440.

In the data set processing and reverse test process flow 420 of FIG. 8, in step 422, a list of data sets that should not be packed is generated from files in the system. The generated list of data sets that should not be packed in step 422 is then passed to a reverse test process in step 426. In step 424, a list of data sets that can be packed is generated from files in the system. The generated list of data sets that can be packed in step 424 is then passed to the reverse test process in step 426.

The reverse test process in step 426 of FIG. 8 may create an application data set from the generated list of data sets that can be packed in step 424 and the generated list of data sets that should not be packed in step 422 and then create a negative copy of the application data set. A pack on operation may be performed on the application data set in step 426 to test if the data set is being accessed by an application while monitoring the data sets. In this scenario, an application will be unable to read the application data set because the data set has a pack on format. The application may either stop working (i.e., go down) or may try to delay to obtain input/output data from the locked data set (i.e., a data set that is in the pack on format). In embodiments, the application may unpack the data set (i.e., convert the data set to a packed off format), restart the application if necessary, and continue processing. In embodiments, the reverse test processes in step 426 may be performed during off peak hours. Further, the application data set in step 426 may be passed to step 428 as an output. In step 428, as a result of the test process, the output (i.e., application data set in step 426) is capable of being a packed data set. The output in step 428 may then be passed to the merge operation in step 440 and/or may be passed to the knowledge base 430.

In step 440 of FIG. 8, the merge operation may merge the output in step 428, the data sets in step 418, and the application groups 300 in step 414. After all of this data is merged, the merged data may be passed to the knowledge base 430. In embodiments, the knowledge base may contain specific application/system/migration data which helps to prepare the data sets for conversion. Accordingly, if a future data set needs to be converted, the knowledge base may have specification application/system/migration data which may help the future data set for conversion from a pack on format to a pack off format. In embodiments of the present disclosure, the steps of the flowcharts 400 of the particle swarm optimization may be performed by a processor, a hardware circuit, and/or firmware of the system.

Figure 9:
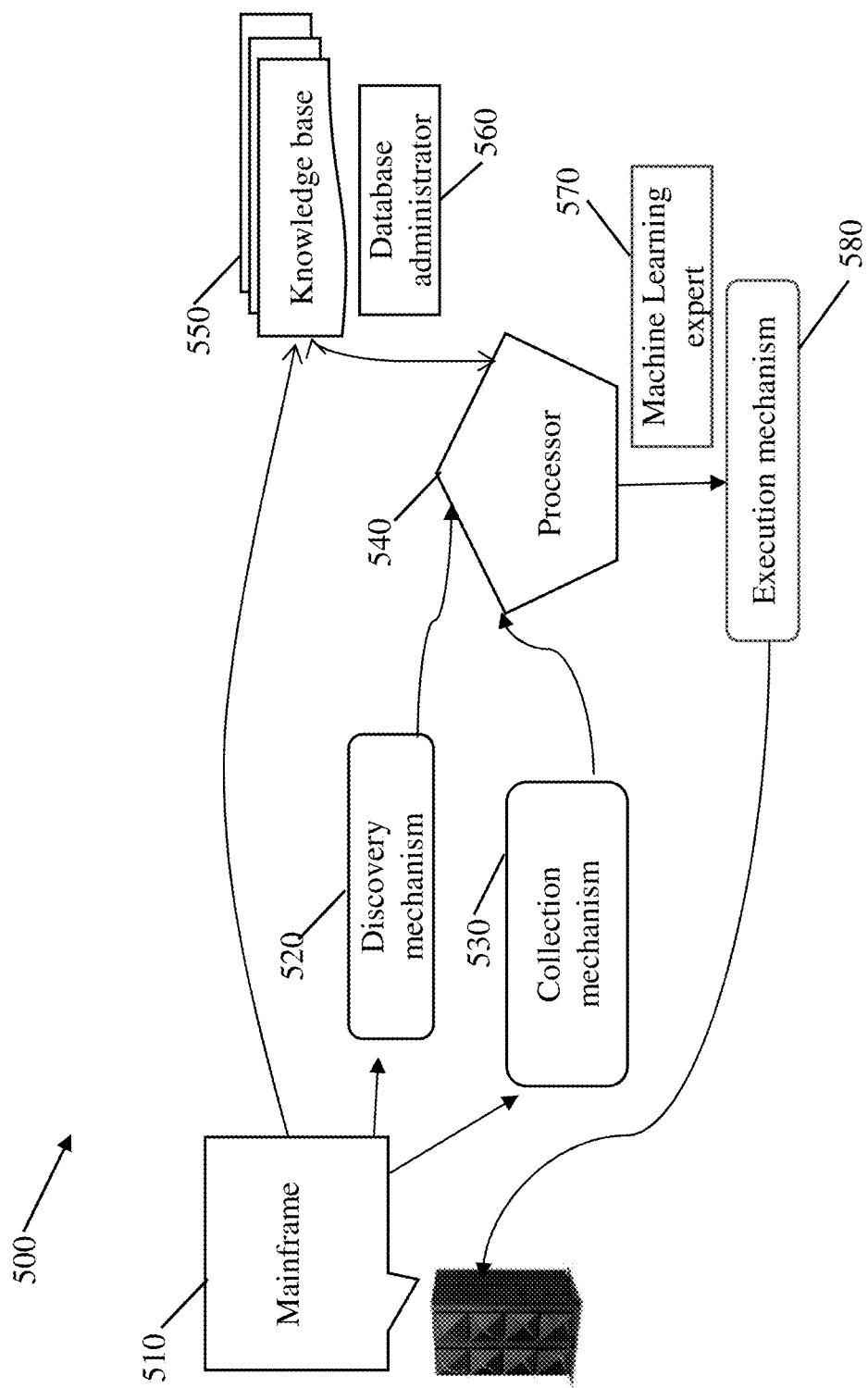
FIG. 9 shows system components and mechanisms for handling compressed files in accordance with aspects of the invention.

FIG. 9 shows system components and mechanisms for handling compressed files in accordance with aspects of the invention. In FIG. 9, a mainframe environment 510 may be scanned for compressed data sets (e.g., data sets in an ISPF pack on format) that need to be converted to an packed off format (i.e., uncompressed format) in a discovery mechanism at reference numeral 520. Further, at reference numeral 530, a collection mechanism may collect a list of relevant data sets for conversion from a packed on format (e.g. compressed format) to an packed off format (i.e. uncompressed format). The data sets at reference numerals 520 and 530 may then be passed to a processor at reference numeral 540. In addition, at reference numeral 550, a database administrator 560 may send instructions for sending specific application/system/migration data from the knowledge base 550 to the processor in step 540 so that the data sets can be prepared for automatic detection and conversion.

In FIG. 9, at reference numeral 540, the processor may implement the particle swarm optimization (PSO) algorithm with a machine learning expert 570 to proactively discover data sets that need to be converted to a packed off format. At reference numeral 580, in an execution mechanism, the data sets may be converted from a packed on format to an packed off format and marked such that an option for the data sets being in the packed on format is permanently disabled. After the processes at reference numeral 580, the converted data sets (which are now in the packed off format) may also be sent back to the mainframe 510. In embodiments, the mainframe 510 may be a hardware device which contains a file system and may be managed by a system programmer. In embodiments of the present disclosure, each of the discovery mechanism, the collection mechanism, and the execution mechanism may comprise a processor, a hardware circuit, and/or firmware for performing their respective functions of FIG. 9.

In embodiments, a service provider could offer to perform the processes described herein. In this case, the service provider can create, maintain, deploy, support, etc., the computer infrastructure that performs the process steps of the invention for one or more customers. These customers may be, for example, a business that tracks worker safety and provides health remediation to improve worker safety. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    monitoring, by a computing device, a data set format of files in a computing system to determine a list of data sets in a first format which are accessed greater than a predetermined number of times;
    gathering, by the computing device, the list of data sets in the first format within the computing system;
    discovering, by the computing device, additional data sets that need to be converted to the second format using particle swarm optimization (PSO);
    converting, by the computing device, the list of data sets and the additional data sets in the first format within the computing system to a second format which is different from the first format; and
    permanently disabling the list of data sets from being in the first format directly after conversion of the list of data sets to the second format,
    wherein the PSO discovers the additional data sets by grouping at least one additional group using a neighborhood topology based on the additional data sets within the at least one additional group being mission critical and having a number of accesses per hour within a first predetermined search space and a transactional chattiness within a second predetermined search space, and
    the first format is a pack on format comprising a compressed format and the second format is a pack off format comprising an uncompressed format.

2. The method of claim 1, further comprising receiving at least one of application data, system data, and migration data used to prepare the list of data sets for conversion.

3. The method of claim 2, wherein the at least one of application data, system data, and migration data is in a knowledge base.

4. The method of claim 3, wherein the application data, system data, and migration data corresponds with a data set from a previous conversion.

5. The method of claim 1, further comprising sending data from the list of data sets to a knowledge base.

6. The method of claim 5, wherein the data from the list of data sets in the knowledge base is used for another conversion.

7. The method of claim 1, wherein the neighborhood topology comprises a plurality of candidate solutions that are optimized within a search space.

8. The method of claim 7, wherein the converting the list of data sets and the additional data sets in the first format within the computing system to the second format occurs during off peak hours.

9. The method of claim 8, wherein the additional data sets comprise load libraries, operating system connect data sets, file transfer protocol (FTP) data sets, application critical data sets, and system critical data sets.

10. The method of claim 1, further comprising performing, by the computing device, machine learning based on a knowledge base to detect other data sets in the first format that need to be converted to the second format.

11. The method of claim 10, wherein the knowledge base comprises previous data sets which are used for the conversion of the other data sets in the first format within the computing system to a second format.

12. The method of claim 11, further comprising converting, by the computing device, the other data sets in the first format within the computing system to a second format which is different from the first format.

13. The method of claim 12, wherein the knowledge base comprises migration data which helps to prepare the other data sets for conversion.

14. A computer program product comprising one or more computer readable storage media having program instructions collectively stored on the one or more computer readable storage media, the program instructions executable to:
    detect a list of data sets in a first format using particle swarm optimization (PSO) which groups a first additional group using a neighborhood topology based on the list of data sets within the at least one additional group being mission critical and having a number of accesses per hour within a first predetermined search space and a transactional chattiness within a second predetermined search space in a computing system and a second additional group by creating a negative copy of an application data set and performing a reverse test process on the negative copy of the application data set to determine the second additional group which is capable of being converted to a second format;
    convert the list of data sets in the first format within the computing system to the second format which is different from the first format; and
    permanently disable the list of data sets from being converted to the first format directly after conversion of the list of data sets to the second format within the computing system, wherein the first format is a pack on format comprising a compressed format and the second format is a pack off format comprising an uncompressed format.

15. The computer program product of claim 14, further comprising receiving at least one of application data, system data, and migration data used to prepare the list of data sets for conversion.

16. The computer program product of claim 15, wherein the application data, system data, and migration data is in a knowledge base.

17. The computer program product of claim 16, wherein the application data, system data, and migration data comprises data used for converting the list of data sets to the second format.

18. The computer program product of claim 17, wherein the data from the list of data sets in the knowledge base is used for another conversion.

19. The computer program product of claim 14, further comprising sending data from the list of data sets to a knowledge base.

20. A system comprising:
a processor, a computer readable memory, one or more computer readable storage media, and program instructions collectively stored on the one or more computer readable storage media, the program instructions executable to:
receive data of a list of data sets from a knowledge base library in a computing system;
detect the list of data sets in a first format using particle swarm optimization (PSO) which groups at least one additional group a neighborhood topology based on the list of data sets within the at least one additional group being mission critical and having a number of accesses per hour within a first predetermined search space and a transactional chattiness within a second predetermined search space in a computing system;
automatically convert the list of data sets in the first format within the computing system to a second format different from the first format based on the received data of the list of data sets from the knowledge base library; and
permanently disable the list of data sets from being in the first format directly after automatic conversion of the list of data sets to the second format,
wherein the first format is a pack on format comprising a compressed format and the second format is a pack off format comprising an uncompressed format.

21. A method, comprising:
scanning for compressed data sets that need to be converted to corresponding uncompressed data sets within a mainframe;
proactively discovering other compressed data sets that need to be converted to corresponding uncompressed data sets within the mainframe using particle swarm optimization (PSO);
converting the compressed data sets from scanning and the other compressed data sets from the proactive discovery to corresponding uncompressed data sets; and
permanently disabling the corresponding uncompressed data sets from being converted to the compressed data sets directly after conversion of the compressed data sets to the corresponding uncompressed data sets,
wherein the PSO proactively discovers the other compressed data sets by grouping at least one additional group using a neighborhood topology based on the other compressed data sets within the at least one additional group being mission critical and having a number of accesses per hour within a first predetermined search space and a transactional chattiness within a second predetermined search space.

22. The method of claim 21, wherein the compressed data set comprises an interactive system productivity facility (ISPF) pack on format.

23. A computer program product comprising one or more computer readable storage media having program instructions collectively stored on the one or more computer readable storage media, the program instructions executable to:
proactively discovering compressed data sets that needs to be converted to corresponding uncompressed data sets within a mainframe using particle swarm optimization (PSO);
automatically converting the compressed data sets to corresponding uncompressed data sets; and
permanently disabling the corresponding uncompressed data sets from being converted to the compressed data sets directly after automatic conversion of the compressed data sets to the corresponding uncompressed data sets,
wherein the PSO proactively discovers the compressed data sets by grouping at least one additional group using a neighborhood topology based on the compressed data sets within the at least one additional group being mission critical and having a number of accesses per hour within a first predetermined search space and a transactional chattiness within a second predetermined search space.

* * * * *